Feb. 21, 1950 J. BERRITTA 2,498,148
TOOLHOLDER
Filed May 3, 1947 2 Sheets-Sheet 1
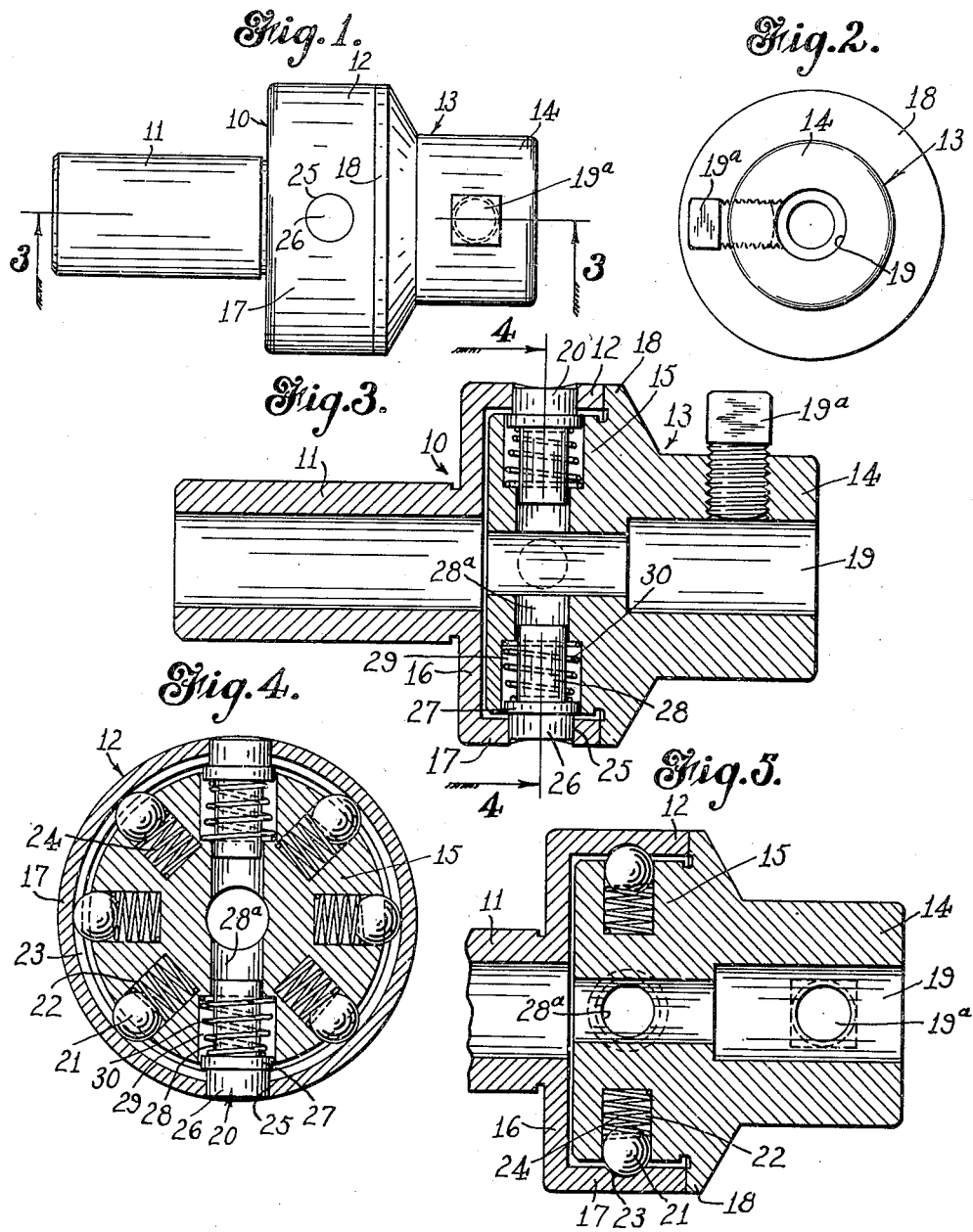
Inventor
James Berritta
By Rockwell & Bartholow
Attorneys Feb. 21, 1950  J. BERRITTA  2,498,148
TOOLHOLDER
Filed May 3, 1947  2 Sheets-Sheet 2
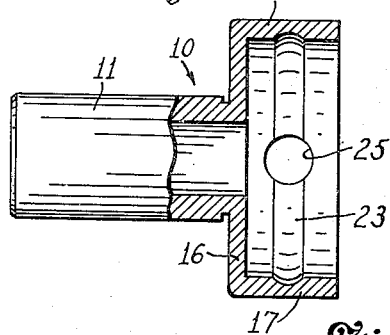
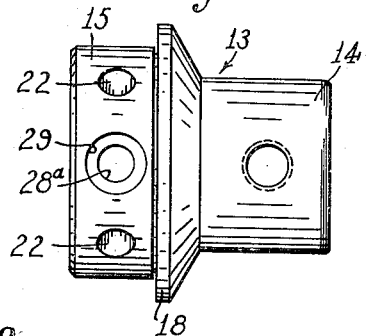
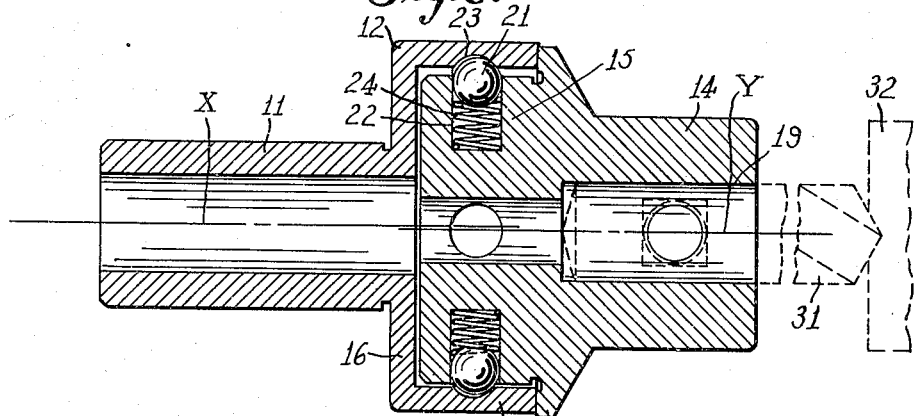
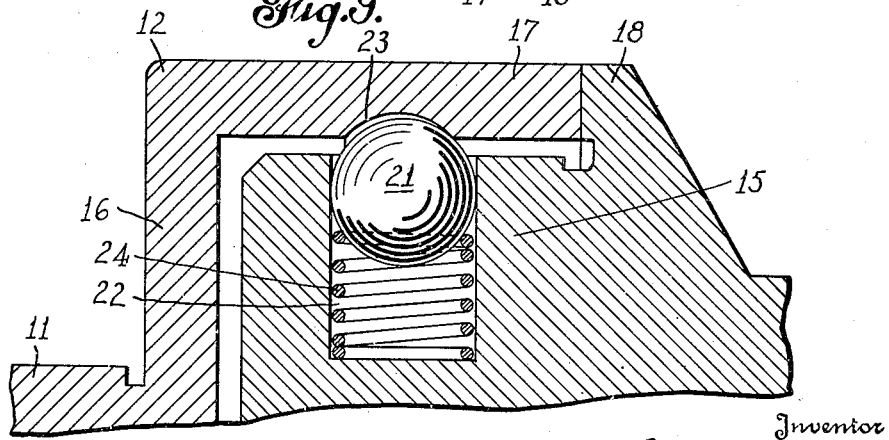
Inventor
James Berritta
By Rockwell & Bartholow
Attorneys Patented Feb. 21, 1950

2,498,148

UNITED STATES PATENT OFFICE 2,498,148

TOOLHOLDER

James Berritta, New Britain, Conn.

Application May 3, 1947, Serial No. 745,784

6 Claims. (Cl. 279—16)

This invention relates to tool holders of the class disclosed in my Patent No. 2,309,495, of January 26, 1943.

One object of the invention is to provide an improved tool holder by means of which a straight rather than a crooked hole is formed in the workpiece.

Another object is to provide an improved tool holder of such construction that the tool axis can be offset somewhat from the axis of the shank member provided with the hollow head, although the tool axis will be parallel to the shank member.

Another object is to provide a tool holder of simple structure which in action is superior to those previously used.

In the accompanying drawings:

Fig. 1 is a side elevation of a tool holder embodying the invention;

Fig. 2 is an end view looking from the right-hand end of Fig. 1;

Fig. 3 is an enlarged longitudinal section on line 3—3 of Fig. 1;

Fig. 4 is a section on line 4—4 of Fig. 3;

Fig. 5 is a fragmentary longitudinal section taken at right angles to Fig. 3;

Fig. 6 is an elevation, partly in section, of the shank member;

Fig. 7 is an elevation of the tool-carrying member;

Fig. 8 is a view somewhat similar to Fig. 5, showing the tool-carrying member laterally offset with respect to the shank member; and Fig. 9 shows a portion of Fig. 8 on a larger scale.

In its general structure the present tool is similar to that disclosed in my Patent No. 2,309,495, the tool being in the nature of a chuck for drills, reamers and taps comprising a shank member having an outer hollow head, and a tool holder provided with a socketed tool-holding portion and with a shell entered into the said hollow head, there being a floating-permitting gap between the shell and the head, and driving means extended across the gap and comprising double-ended plugs or pins having ends engaged in apertures of the head and their opposite ends engaged in sockets provided in the shell, the driving plugs or pins being pressed radially outwardly by means of springs located in sockets of the shell. Moreover, as shown in the previous patent, the shell is provided intermediate of its ends with a laterally projecting flange adapted to engage the end face or rim of the head. However, while the two devices are similar in these respects, there are important differences of structure and mode of operation, as will be apparent from the following description.

In the drawings, the shank member is shown generally at 10, the same having the hollow shank 11 and the head 12. The tool-carrying member is shown at 13, the same having the socketed tool-carrying portion 14, and integral therewith the shell 15, the latter being a member of generally cylindrical shape received with clearance in the head 12. The head 12 is provided with a lateral wall 16 and a cylindrical wall 17 presenting, in conjunction, a round cup within which the shell 15 is received. The shell has integral therewith an outstanding flange 18 presenting a face adapted to be engaged by the end face or rim of the head 12. The tool-carrying member is provided with a socket 19 to receive the tool, in which socket the tool is clamped by a suitable clamping screw 19$^a$.

The drive pins or plugs previously mentioned are indicated at 20, and in the present case there are two of these members, the same being in alignment diametrically. In substantially the same plane as the drive pins 20 is a series of spring-pressed balls 21 arranged to move in radially disposed sockets 22 provided in the shell. In the case illustrated there are six of these spring-pressed balls, three being arranged at one side of a longitudinal plane passing through the drive pins, and three being arranged at the opposite side, as shown in Fig. 4. These balls, as hereinafter described, engage a circumferential groove 23 provided upon the inner surface of the longitudinal wall of head 12. The sockets 22 in which the balls are received are formed by drilling out the head 15, and these sockets are closed at their bottoms, as shown, and interposed between the socket bottoms and balls are springs 24 which press the balls outwardly so as to maintain them in contact with the annular groove 23. The groove 23 is a shallow groove having a curvature corresponding to that of the balls, and the median plane of the groove coincides with the plane in which are located the holes 25 in which are received the outer ends of the pins 20, as shown in Fig. 6.

Each driving pin 20 has a cylindrical outer part 26 closely fitting the round hole 25 in the head. Radially inwardly from the portion 26 of the drive pin is a laterally projecting collar 27. Inwardly of the collar 27 the shank of the drive pin is reduced in diameter, as shown at 28, and this diameter of the pin is continued to its inner end. The inner end of each drive pin is engaged in a socket portion provided by a bore 28ª. Outwardly of the bore 28ª the socket is laterally enlarged, as shown at 29, and in this enlarged portion 29 is disposed the spring 30 acting on the driving pin, said spring embracing the driving pin and having an enlarged inner end acting against the bottom of socket portion 29. The spring 30 has a smaller outer end acting against the inner face of the collar 27. The spring 30 presses the driving pin outwardly so as to hold the end portion 26 of the pin in the hole 25.

The action of the balls 21 is such as to bring about an axial thrust of the head 12 relatively to the shell 15, such that the rim of the head is strongly pressed against the opposing face of the flange 18. This is achieved by appropriate location of the annular groove 23, which, when the head and shell flange are in firm frictional engagement with each other, is somewhat out of line with the plane of the ball sockets 22 so that the balls engage the groove laterally at one side of the groove, as shown in Fig. 9, to exert axial thrust on the head and force it against the flange or shoulder. It is understood that the balls fit snugly within their cylindrical sockets so as to be held against lateral displacement, and it will be observed from Fig. 9, which shows the parts on a large scale, that the median plane of the groove is offset slightly to the left with reference to the plane of the sockets 22. This axial thrust of the balls upon the head is not interfered with by the so-called driving pins 20, because of the fact that the latter have some lateral clearance in their sockets consisting of the bores 29 and 28ª, the collar or flange 27 of each pin having some lateral clearance in bore 29, and the inner end of each pin having some lateral clearance in the bore 28ª. While, however, there is some looseness of the pins in their sockets in the shell, the pins act effectively to prevent rotation of the shell relatively to the head.

Reverting to the offsetting of the annular groove, as previously mentioned, and referring again to Fig. 9, it may be said that the offsetting is achieved by having the median plane of the socket 22 somewhat nearer to the flange 18 than is the median plane of the groove when the head is in firm contact with the flange.

In the use of the device there may be some misalignment of the axis of the shell with reference to the axis of the head. This is indicated in Fig. 8, where the axis of the head is indicated by the broken line "X" and the axis of the shell by the broken line "Y." While there is this misalignment, there is, nevertheless, perpendicularity of the axis "Y," which is the axis of the tool, with reference to the transverse plane of the head, this being due to the continued firm engagement of the shell flange with the head notwithstanding the misalignment. Assuming that the structure shown in Fig. 8 is stationarily held in a turret, with a tool such as a drill 31 clamped in the tool socket, and assuming that a workpiece 32 is rotated and advanced against the drill, the drill will maintain a perpendicular position after having been centered with respect to the work, and will not be caused to cut a crooked or slanting hole, as would be the case if firm engagement were not maintained between the head and the shell flange. Moreover, the tool and its holding shell, having once been properly located in a lateral direction with respect to a workpiece, this position can be maintained as the tool acts on similar workpieces in repeated operations of the machine.

The lateral movement of the shell with respect to the head permitted by the clearance between the shell and the cup-shaped portion of the shank member, permits compensation for misalignment, and misalignment, as above explained, can take place without canting of the tool axis with reference to the axis of the supporting head. For these reasons, and others which will occur to those skilled in the art, the tool holder has a more satisfactory operation than those of previous holders, and yet the construction is relatively simple and inexpensive. The parts can also be assembled without difficulty.

While in this description there is reference to the use of a stationary tool holder and a rotating workpiece, it is understood that in some cases it may be advantageous to use a rotating tool.

While in the case shown the connecting pins or so-called driving pins are located in the same plane as the balls which act as take-up devices, this arrangement need not be adopted in all cases, for it is obviously possible to place these elements in different transverse planes.

Only one form of the improved tool holder is illustrated in the drawings, but it will be apparent that various modifications and changes in the details may be made without departing from the principles of the invention or the scope of the claims.

What I claim is:

1. In a tool holder, the combination of a head member having a cup-shaped recess, a shell member in the recess having a peripheral surface spaced from the opposing surface of the head to provide a gap permitting a floating action, the shell and head having axially opposing surfaces limiting their axial approaching movement, the head where it overlies the shell being provided with an internal circumferential groove, spring-pressed balls disposed in sockets in the shell engaging the side of the groove nearest the mouth of the recess in a manner to exert lateral thrust to maintain firm interengagement of the above-mentioned limiting surfaces so as to maintain the axis of the shell member in positions parallel to that of the head member, and members in the form of pins socketed in the shell and head and acting to limit relative rotation of the shell and head.

2. In a tool holder, the combination of a head member having a cup-shaped recess, a shell member partially disposed in said recess and having a laterally projecting flange intermediate its ends opposed to the rim of the head and engageable therewith, the peripheral surface of the shell within the head being spaced away from the head to provide a gap permitting floating action, the inner surface of the head opposing the peripheral portion of the shell being provided with a circumferential groove, spring-pressed balls disposed in sockets in the shell and engaging the shell sockets and the side of the groove nearest the mouth of the recess in a manner to cause firm lateral engagement of the shell flange with the head rim, and connecting members between the head and shell limiting their relative rotational movement.

3. A tool holder as set forth in claim 2, in which the connecting members are constituted by pins and in which these pins and the spring-pressed balls disposed in the shell and engaging the groove in the head are located substantially in the same transverse plane.

4. A tool holder as set forth in claim 2, in which the connecting members are constituted by diametrically arranged pins, and in which the spring-pressed balls disposed in the shell and engaging the groove in the head are in substantially the same transverse plane as said pins.

5. In a tool holder, the combination of a head member having a cup-shaped recess and a rim around the recess, a shell member having a portion entering said recess with lateral clearance to provide a floating-permitting gap, a flange rigid with the shell engageable with the rim of the head, members constituted by socketed spring-pressed balls in the shell extending across the gap between the shell and the head and engaging the head and the shell, said members permitting relative rotation between the shell and head, and drive pins connecting the shell and head and serving to prevent relative rotation of the shell and head.

6. A tool holder as set forth in claim 5, in which the members maintaining the flange in engagement with the head rim are engaged with the side portion of a shallow groove extending around the inner surface of the longitudinal wall of the head and which side is nearest the mouth of the recess.

JAMES BERRITTA.

REFERENCES CITED

The following references are of record in the file of this patent:

UNITED STATES PATENTS

| Number | Name | Date |
| --- | --- | --- |
| 1,234,455 | Fox | July 24, 1917 |
| 1,334,898 | Gyllsdorff | Mar. 23, 1920 |
| 2,353,834 | Klute | July 18, 1944 |

FOREIGN PATENTS

| Number | Country | Date |
| --- | --- | --- |
| 435,779 | Great Britain | of 1935 |